US010170044B2

(12) United States Patent
Park et al.

(10) Patent No.: US 10,170,044 B2
(45) Date of Patent: Jan. 1, 2019

(54) ORGANIC LIGHT EMITTING DISPLAY AND METHOD OF DRIVING THE SAME

(71) Applicant: LG Display Co., Ltd., Seoul (KR)

(72) Inventors: Youngju Park, Seoul (KR); Sanghyun Lim, Goyang-si (KR); Sanghoon Jeong, Iksan-si (KR)

(73) Assignee: LG DISPLAY CO., LTD., Seoul (KR)

( * ) Notice: Subject to any disclaimer, the term of this patent is extended or adjusted under 35 U.S.C. 154(b) by 238 days.

(21) Appl. No.: 15/233,510

(22) Filed: Aug. 10, 2016

(65) Prior Publication Data

US 2017/0061865 A1 Mar. 2, 2017

(30) Foreign Application Priority Data

Aug. 31, 2015 (KR) ........................ 10-2015-0123255

(51) Int. Cl.

| | |
|---|---|
| ***G06F 3/041*** | (2006.01) |
| ***G09G 3/325*** | (2016.01) |
| ***G09G 3/3266*** | (2016.01) |
| ***G09G 3/3283*** | (2016.01) |

(52) U.S. Cl.

CPC ........... *G09G 3/325* (2013.01); *G09G 3/3266* (2013.01); *G09G 3/3283* (2013.01); *G09G 2310/0267* (2013.01); *G09G 2310/0286* (2013.01); *G09G 2310/0297* (2013.01); *G09G 2320/029* (2013.01); *G09G 2320/0233* (2013.01); *G09G 2320/06* (2013.01); *G09G 2320/0626* (2013.01)

(58) Field of Classification Search

CPC ..... G09G 2320/0242; G09G 2300/043; G09G 3/3275

USPC .................................................. 345/173–178

See application file for complete search history.

(56) References Cited

U.S. PATENT DOCUMENTS

2014/0022289 A1* 1/2014 Lee ...................... G09G 3/3283 345/691

2015/0379937 A1* 12/2015 Kim ...................... G09G 3/006 345/691

FOREIGN PATENT DOCUMENTS

| | | | |
|---|---|---|---|
| CN | 101477783 | A | 7/2009 |
| CN | 102177487 | A | 9/2011 |
| CN | 103578411 | A | 2/2014 |
| CN | 103714777 | A | 4/2014 |
| CN | 103903561 | A | 7/2014 |
| KR | 10-2014-0080652 | A | 7/2014 |

(Continued)

*Primary Examiner* — Roy P Rabindranath

(74) *Attorney, Agent, or Firm* — Birch, Stewart, Kolasch & Birch, LLP

(57) ABSTRACT

An organic light emitting display, and a driving method thereof are discussed. The organic light emitting display according to an embodiment includes a plurality of pixels sharing a sensing path, a first switch circuit configured to supply a sensing data voltage to the pixels sharing the sensing path through data lines in response to a first scan pulse, a second switch circuit configured to electrically connect an Organic Light Emitting Diode (OLED) of each of the pixels with the sensing path in response to a second scan pulse to simultaneously supply currents of the pixels to the sensing path in a sensing period, and a sensing circuit configured to sense a sensing value through the sensing path. The sensing path includes a reference voltage line connected to the pixels to provide the currents of the pixels to the sensing circuit. The pixels simultaneously sensed by the sensing circuit have a same sensing value.

15 Claims, 15 Drawing Sheets

(56) References Cited

FOREIGN PATENT DOCUMENTS

| | | | |
|---|---|---|---|
| KR | 10-2015-0074657 | A | 7/2015 |
| KR | 10-2015-0079003 | A | 7/2015 |

* cited by examiner $Id = a' \times (Vdata - b')^{c}$

ORGANIC LIGHT EMITTING DISPLAY AND METHOD OF DRIVING THE SAME

This application claims the benefit of Korean Patent Application No. 10-2015-0123255 filed on Aug. 31, 2015, the entire contents of which are incorporated herein by reference for all purposes as if fully set forth herein.

BACKGROUND OF THE INVENTION

Field of the Invention

The present disclosure relates to an organic light emitting display enabled to improve image quality based on a result of sensing driving characteristic variations of pixels.

Discussion of the Related Art

An active-matrix type organic light emitting display includes Organic Light Emitting Diodes (OLEDs), and it shows a fast reaction speed while its light-emitting efficiency, luminance, and field of view are great. An OLED includes an organic compound layer formed between an anode and a cathode. The organic compound layer includes a Hole Injection Layer (HIL), a Hole Transport Layer (HTL), an Emission Layer (EML), an Electron Transport Layer (ETL), and an Electron Injection Layer (EIL). If a driving voltage is applied to the anode and the cathode, a hole passing through the HTL and an electrode passing through the ETL move to the EML to form an exciton, and thereby, the EML generates a visible light.

Each pixel of the organic light emitting display includes a driving device that controls a current flowing in the OLED. The driving device may be implemented as a Thin Film Transistor (TFT). It is desirable to design the driving device has uniform electrical characteristics, such as a threshold voltage and mobility, in all pixels. However, due to the manufacturing conditions and driving environment, it is hard for the driving TFT to have the uniform electrical characteristics. As time goes by, more stress is applied to the driving device, and the stress may be different depending on a data voltage. The electrical characteristics of the driving device are affected by the stress. Thus, electrical characteristics of the driving TFT are changed once a driving period of time has elapsed.

Methods of compensating for a change in driving characteristics of a pixel in an OLED display device are divided into an inner compensation method and an external compensation method.

The inner compensation method is implemented in a manner of automatically compensating for threshold voltage deviation between driving TFTs in a pixel circuit. For the inner compensation, a current flowing in the OLED needs to be determined regardless of the threshold voltage of the driving TFT, such that a structure of the pixel circuit becomes complex. The inner compensation method is hard to compensate for mobility deviation between the driving TFTs.

The external compensation method is implemented by sensing electrical characteristics (a threshold voltage, mobility, etc.) of the driving TFTs and then modulating pixel data of an input image in a compensation circuit located outside a display panel based on the sensing result so as to compensate for driving characteristic changes of each pixel.

The external compensation method is implemented by receiving a sensing voltage directly from each pixel through a reference voltage line connected to pixels of the display panel, generating a sensing value by converting the sensing voltage into digital sensing data, and then transmitting the sensing value to a timing controller. The timing controller modulates digital video data of an input image based on the sensing value to compensate for driving characteristic changes in each pixel.

As resolution of an organic light emitting displays and efficiency of an organic compound have improved, an amount of a current required to drive a pixel (or a required current for each pixel) has been dramatically reduced. To sense driving characteristic changes of a pixel, a sensing current received from the pixel is also reduced. If the sensing current is reduced, a capacitor of a sample & holder is charged less in a limited sensing period, thereby making it difficult to sense driving characteristic changes of the pixel. The sample & holder charges the sensing current in the capacitor to sample a sensing voltage received from the pixel.

If the sensing current becomes low, it fails to satisfy the minimum resolution of an analog-to-digital converter (ADC) and thus driving characteristics of the pixel cannot be sensed. Basically, the sensing voltage received from the pixel is converted by the ADC into digital data. However, if a current of the pixel becomes low, the sensing voltage received from the pixel becomes lower than the minimum input voltage to the ADC. When driving characteristics of the pixel in low gray-scale data are sensed, a current of the pixel becomes low and thus the driving characteristics of the pixel in a low gray-scale cannot be compensated. On the other hand, a pixel has a great amount of current in high gray-scale data, so that it is possible to sense driving characteristics of a high-resolution and high-contrast pixel.

SUMMARY OF THE INVENTION

The present disclosure provides an organic light emitting display enabled to sense driving characteristic changes of the pixel in a low gray-scale, and a driving method of the organic light emitting display.

An organic light emitting display of the present disclosure includes: a plurality of pixels sharing a sensing path; a first switch circuit configured to supply a sensing data voltage to the pixels sharing the sensing path through data lines in response to a first scan pulse; a second switch circuit configured to electrically connect an Organic Light Emitting Diode (OLED) of each of the pixels with the sensing path in response to a second scan pulse, to simultaneously supply currents of the pixels to the sensing path in a sensing period; and a sensing circuit configured to sense a sensing value through the sensing path, wherein the sensing path includes a reference voltage line connected to the pixels to provide the currents of the pixels to the sensing circuit, and wherein the pixels simultaneously sensed by the sensing circuit have a same sensing value, and data to be written to the pixels is compensated with a same compensation value.

A method of driving the organic light emitting display includes: supplying a sensing data voltage to each of the pixels through data lines; turning on a switch to electrically connect an Organic Light Emitting Diode (OLED) of each of the pixels and the sensing path, to simultaneously supply currents of the pixels to the sensing path, wherein the sensing path includes a reference voltage line connected to the pixels to provide the currents of the pixels to a sensing circuit; outputting a sensing value of the pixels by sampling a voltage of the sensing path and converting the sampled voltage into digital data; and compensating for a driving characteristic deviation of the pixels by modulating data of an input image to be written to the pixels based on the sensing value, wherein simultaneously sensed pixels have a same sensing value, and data to be written to the pixels is compensated with a same compensation value.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
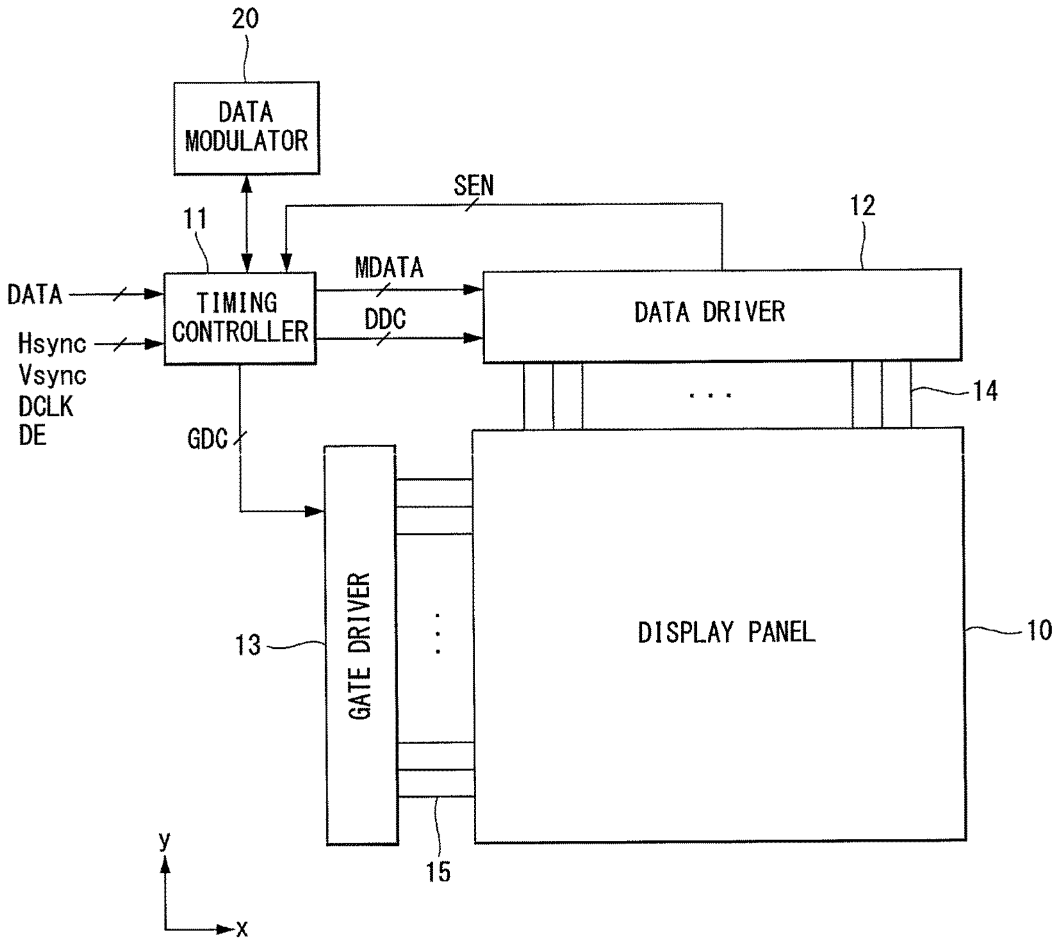
FIG. 1 is a block diagram illustrating an organic light emitting display according to an embodiment of the present disclosure.
Figure 2A:
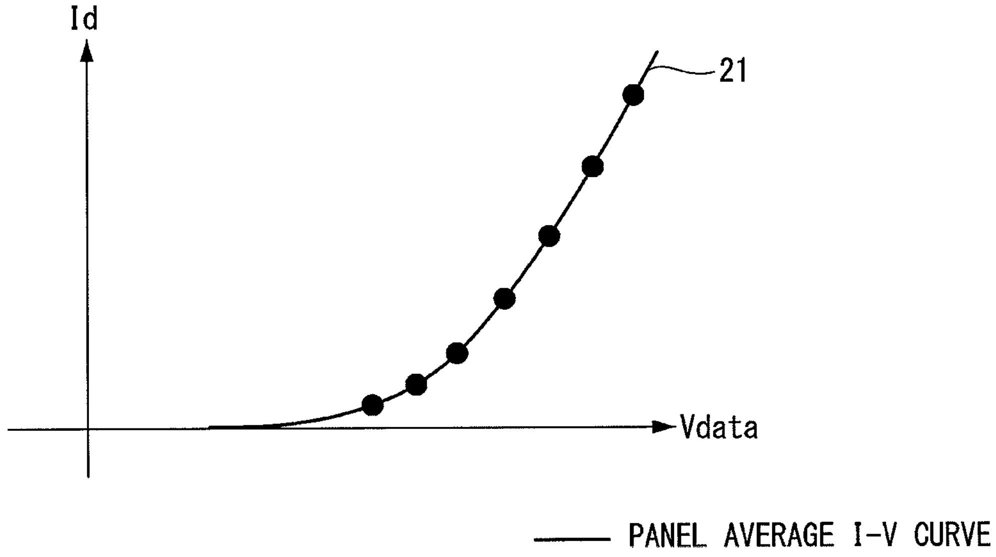
FIGS. 2A to 2C are diagrams illustrating a transfer curve of a driving thin film transistor (TFT) according to a data voltage, and a method of compensating for driving characteristic deviation using the transfer curve.
Figure 2B:
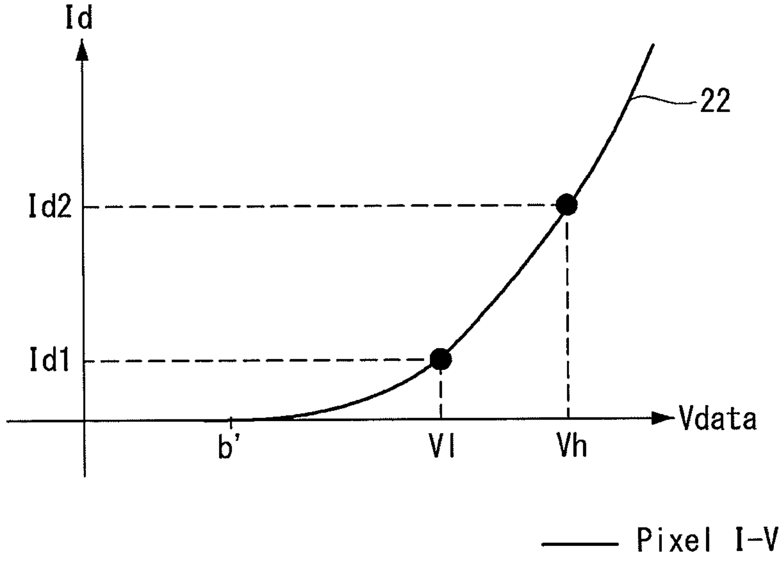
Figure 2C:
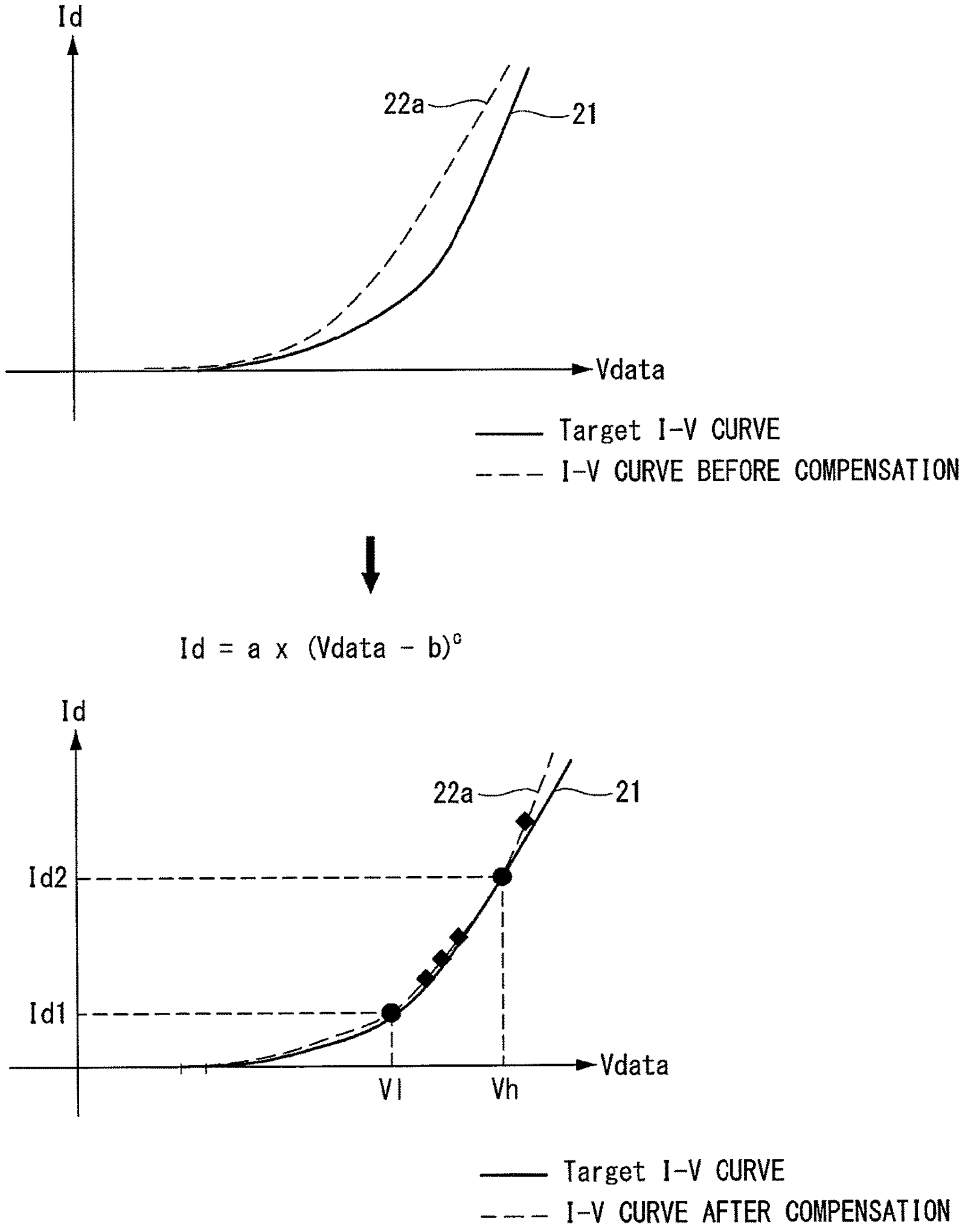

FIG. 1 is a block diagram illustrating an organic light emitting display according to an embodiment of the present disclosure. FIGS. 2A to 2C are diagrams illustrating a transfer curve of a driving thin film transistor (TFT) according to a data voltage, and a method of compensating for driving characteristic deviation using the transfer curve.

Referring to FIGS. 1 to 2C, an organic light emitting display according to an embodiment of the present disclosure includes a display panel 10, a data driver 12, a gate driver 13, and a timing controller 11.

On the display panel 10, a plurality of data lines 14 and a plurality of gate lines 15 cross, and pixels are arranged in a matrix form. Data of an input image is displayed on a pixel array of the display panel 10. The display panel 10 includes a reference voltage line (which is indicated with numeral reference 16 in FIGS. 3 and 4) connecting neighboring pixels, and a VDD line supplying a high-potential driving voltage VDD to pixels. A preset reference voltage (which is indicated by REF in FIGS. 5 and 7) is supplied to the pixels through the reference voltage line.

The gate lines 15 include a plurality of first scan lines to which a first scan pulse is supplied, and a plurality of second scan lines to which a second scan pulse is supplied. In FIGS. 4 to 12, S1 denotes the first scan pulse, and S2 denotes the second scan pulse.

To realize colors, each pixel is divided into a red sub-pixel, a green sub-pixel, and a blue sub-pixel. Each pixel may further include a white sub-pixel. In the following descriptions, a pixel indicates a sub-pixel. A data line, a pair of gate lines, a reference voltage line, a VDD line, etc. are connected to each pixel. The pair of gate lines includes a first scan line and a second scan line.

The present disclosure simultaneously senses pixels that share a sensing path. The pixels sharing a sensing path may be neighboring pixels or may be pixels spaced apart from one another. Hereinafter, a block includes pixels that are simultaneously sensed via a same sensing path. A multi-pixel sensing method according to an embodiment of the present disclosure is implemented in a manner of simultaneously sensing driving characteristics of pixels in each block which includes two or more pixels. Driving characteristics of pixels existing in the same block is sensed as the same value. In the present disclosure, only one sensing value is obtained for each block, and thus, one compensation value is selected depending on the sensing value. Therefore, in the present disclosure, driving characteristics of pixels in a block are sensed as the same value, and data to be written to the pixels in the block is modulated with the same compensation value based on the sensing value. Inventors of the present disclosure have found that the method proposed in the present disclosure, in which sensing and compensating are implemented on a block unit basis, does not lead to a big difference in image quality, compared to an existing one-pixel sensing method, as shown in the results of experiments for evaluating image quality (see FIG. 15). In the organic light emitting display of the present disclosure, a memory storing sensing values has a capacity that is significantly reduced compared to that of the one-pixel sensing method. It is because a sensing value is detected not from each pixel, but from each block which includes two or more pixels.

The sensing path includes a reference voltage line 16 connected to neighboring pixels, as shown in FIGS. 3, 4, 5, and 7. A sensing circuit is connected to the sensing path. The sensing circuit includes a sample & holder and an analog-to-digital converter (ADC). In the present disclosure, driving characteristics of pixels sharing a sensing path are sensed by a sum of currents of the pixels by simultaneously sensing pixels sharing a sensing path, so that it is possible to sense driving characteristics of the pixel in a low gray-scale. A low gray scale may be a gray scale of data of which most significant bits (MSB) may be "$0000_2$", and a high gray scale may be a gray scale of data of which MSB may be "$1111_2$".

In a related art, a current of one pixel is sensed at each time, and, because a sensing current of the pixel in a low gray-scale is low, it is not possible to sense driving characteristics of the pixel in a low gray-scale. Even in the case of pixels sharing a reference voltage line, if one pixel is sensed at each time, a sensing current thereof is low and thus it is not possible to sense driving characteristics of the pixel in a low gray-scale. On the other hand, in the present disclosure, a plurality of pixels are sensed simultaneously via the same sensing path and driving characteristics of the pixels are sensed by a sum of currents flowing in the pixels, so that it is possible to sense driving characteristics of the pixel in a low gray-scale. Therefore, the present disclosure may increase a sensing current so as to sense driving characteristics of pixels beyond an ADC range. In addition, the present disclosure may increase a sensing current so as to stably sense driving characteristics of the pixel, even in a low gray scale, a high-resolution and high-contrast pixel which needs a low required current.

The data driver 12 supplies a sensing data voltage to pixels under control of the timing controller 11 in a sensing period. The sensing period may be allocated as a blank period, that is, a vertical blank period, in which data of an input image is not received in frame periods. The sensing period may include a predetermined period of time immediately after a display device is turned on or off. In this case, the sensing period is set while the organic light emitting display is used, and driving characteristic of a pixel is sensed in every sensing period to thereby update a sensing value stored in a memory. This kind of compensation method may be applied to an application field which has a long lifetime, such as a TV.

Driving characteristic deviation of a pixel may be compensated before the organic light emitting display is released with a measured sensing value, and thus an additional sensing period may not be secured after the organic light emitting display is released. In this case, driving characteristics of pixels are not sensed while user uses the organic light emitting display, and thus, a sensing value which is stored in a memory before the release may not be updated. This compensation method may be applied to a mobile device.

A sensing data voltage SDATA is applied to gates of driving TFTs of the pixels in the sensing period. The sensing data voltage SDATA turns on the driving TFTs in the sensing period to cause currents to flow through the driving TFTs. The sensing data voltage SDATA is produced with a preset gray-scale value. The sensing data voltage SDATA is changed according to a preset sensing gray scale.

In the sensing period, the timing controller 11 transmits sensing data (which is indicated by SDATA in FIGS. 6 and 8) readily stored in an embedded memory. The sensing data SDATA is preset, regardless of data of an input image to sense driving characteristics of a pixel. The data driver 12 outputs a sensing data voltage by converting sensing data SDATA, which is received in the form of digital data, into a gamma compensation voltage through a digital-to-analog converter (DAC). The data driver 12 outputs a sensing value SEN by converting a sensing voltage, which is generated by currents of pixels, into digital data through an ADC. The data driver 12 transmits the sensing value SEN to the timing controller 11. The sensing voltage is in proportional to the currents of the pixels.

In a normal driving period for displaying an input image, the data driver 12 converts digital video data MDATA of an input image received from the timing controller 11 into a data voltage through the DAC, and then supplies the data voltage to the data lines 14. The digital video data MDATA supplied to the data driver 12 is data MDATA which has been modulated by a data modulator 20 based on a result of sensing driving characteristics of a pixel in order to compensate for a change in the driving characteristics.

Circuit devices connected to a sensing path may be embedded in the data driver 12. For example, the data driver 12 may include a sample & holder SH, an ADC, and switch devices MR, MS, M1, and M2 in FIGS. 5 and 7.

Figure 6:
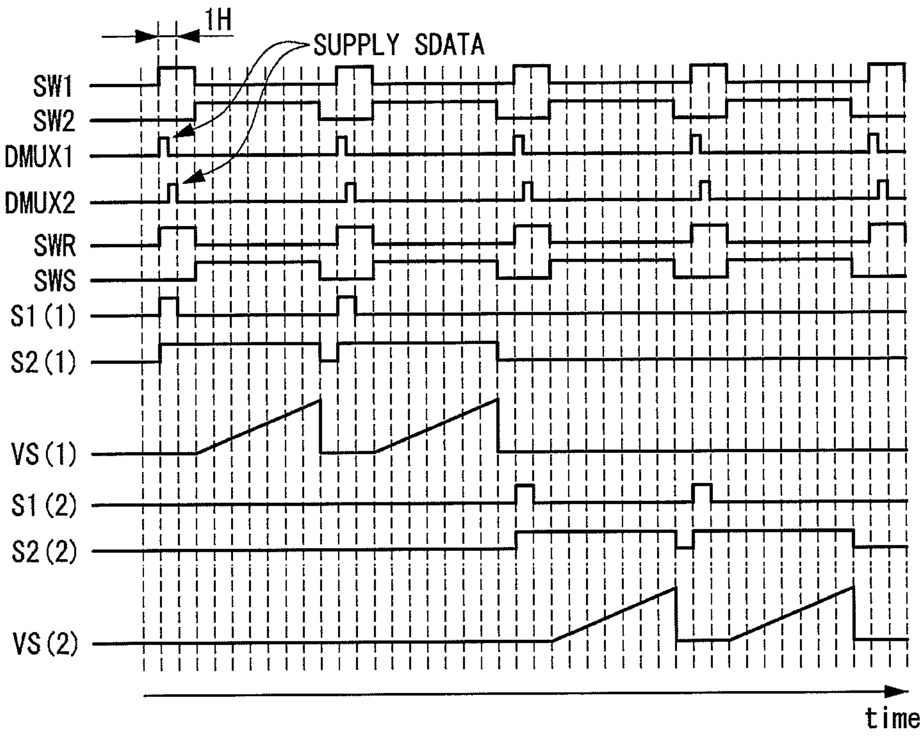
FIG. 6 is a waveform diagram illustrating a method of controlling pixels and a sensing path which are shown in FIG. 5.
Figure 8:
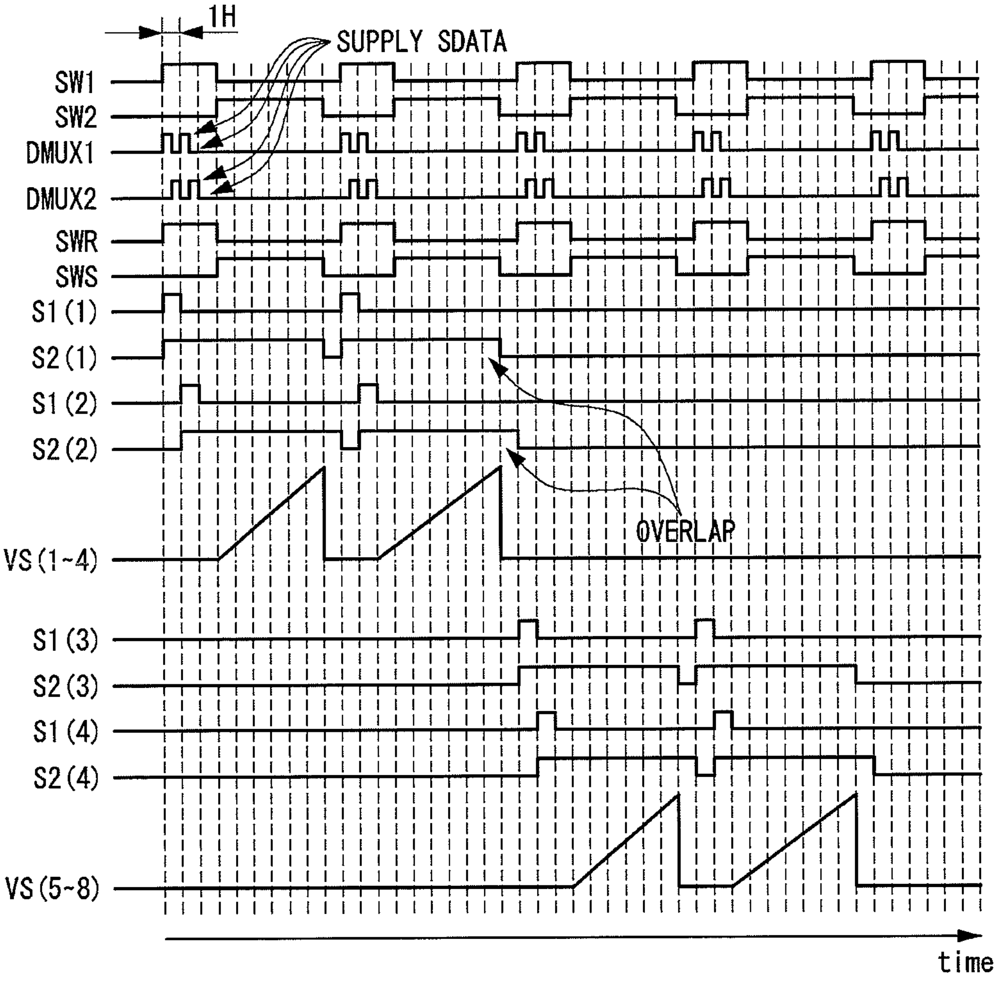
FIG. 8 is a waveform diagram illustrating a method of controlling pixels and a sensing path which are shown in FIG. 7.

The gate driver 13 generates scan pulses S1 and S2, as shown in FIGS. 6 and 8, under control of the timing controller 11, and supplies the scan pulses S1 and S2 to the gate lines 16. The gate driver 13 may supply the scan pulses S1 and S2 sequentially by shifting the scan pulses S1 and S2 using a shift register. The shift register of the gate driver 13 may be formed directly on a substrate of the display panel 10 together with a pixel array in a Gate-driver In Panel (GIP) process.

The timing controller 11 receives, from a host system (not shown), digital video data DATA of an input image and a timing signal which is synchronized with the digital video data DATA. The timing signal includes a vertical sync signal Vsync, a horizontal sync signal Hsync, a clock signal DCLK, a data enable signal DE, and the like. The host system may be any one of a TV system, a set-top box, a navigation system, a DVD player, a Blu-ray player, a personal computer (PC), a home theater system, and a phone system.

Based on the timing signal received from the host system, the timing controller 11 generates a data timing control signal DDC for controlling an operation timing of the data driver 12, and a gate timing control signal GDC for controlling an operation timing of the gate driver 13. The timing controller 11 supplies a sensing value SEN received from the data driver 12 to the data modulator 20, and transmits data MDATA modulated by the data modulator 20 to the data driver 12.

The gate timing control signal GDC includes a start pulse, a shift clock, and the like. The start pulse defines a start timing in which a first output is generated in a shift register. The shift register starts to operate in response to receipt of the start pulse, and outputs a first gate pulse in a first clock timing. A gate shift clock GSC controls an output shift timing of the shift register.

The data modulator 20 calculates parameters (which are indicated by a' and b' in FIG. 2B) of transfer curves (which is an I-V curve and indicated with numeral reference 22 in FIG. 2B) in a block based on a sensing value SEN detected from the block. Then, the data modulator 20 compares each of the calculated parameters with a parameter of an average transfer curve (which is indicated with numeral reference 21 in FIG. 2A), and selects a compensation value used for compensating for a difference therebetween. The data modulator 20 modulates data of an input image, which is to be written to pixels in the block, with the compensation value selected for the block. The compensation value includes an offset value (which is indicated by "b" in FIG. 2C) for compensating for a change in a threshold voltage of a driving TFT, and a gain value (which is indicated by "a" in FIG. 2C) for compensating for a change in mobility of the driving TFT. The offset value "b" is added to digital video data DATA of an input image to compensate for a change in the threshold voltage of the driving TFT. The gain value "a"

is multiplied to the digital video data DATA of the input image to compensate for a change in mobility of the driving TFTs. Since a sensing value is obtained on a block unit basis, the data modulator 20 modulates data to be written to pixels in a block, by applying the same compensation value to the data. A memory of the data modulator 20 stores an average transfer curve of the display panel 10, and parameters necessary to calculate an offset value, a gain value, and the like. The data modulator 20 may be embedded in the timing controller 11.

FIGS. 2A to 2C are diagrams illustrating a transfer curve of a driving TFT according to a data voltage, and a method of compensating for driving characteristic deviation of pixels using the same.

Referring to FIGS. 2A to 2C, a driving TFT regulates a current Ioled of an OLED according to a data voltage Vdata applied to a gate of the driving TFT.

Before an organic light emitting display is released, the present disclosure senses a current of an OLED in gray scales which are preset for all pixels on the organic light emitting display. For example, the present disclosure applies seven gray-scale voltages at an equal interval to pixels, respectively, and measures a current flow flowing in each of the pixels to derive a transfer curve of each of the pixels independently. Specifically, a transfer curve (I-V curve) of each of the pixels is derived by approximating, based on an approximate expression, a difference between the pixels' driving characteristic values measured in the seven gray-scales.

The present disclosure is able to obtain a transfer function for each sub-pixel, as shown in FIG. 2A, by using a number of gray-scale voltages and currents flowing across the display panel 10. In addition, the present disclosure is able to store an average of the transfer function as an average transfer curve (I-V curve in FIG. 2A) of the display panel 10 in the memory of the data modulator 20. In FIG. 2A, X axis represents a data voltage Vdata applied to a gate of a driving TFT, and Y axis represents a drain current Id of the driving TFT according to the data voltage Vdata.

After an organic light emitting display is released, the present disclosure may compensate for driving characteristic deviation of pixels of the organic light emitting display with a sensing value sensed before the release. Depending on an application field, it is possible to update a change in driving characteristics of each pixel in each sensing period when the organic light emitting display normally operates after the release. As shown in FIG. 2B, the present disclosure applies a low gray-scale voltage V1 and a high gray-scale voltage Vh to a gate of a driving TFT to sense a current I of a block in a low gray-scale and a high gray-scale. The current of a block indicates a sum of currents that flow in pixels which share a sensing path and simultaneously sensed in the block. The present disclosure applies low and high gray-scale current values sensed on a block unit basis to a preset quadratic equation to derive a transfer curve (I-V curve) in all gray-scales. Thus, if a low gray scale current value of a pixel is not sensed because a current of the pixel is too low, it is not possible to obtain a transfer curve like the curve shown in FIG. 2B.

The present disclosure simultaneously senses pixels, which share a sensing path, on a block unit basis to increase a low gray-scale current, thereby enabled to sense, even in a low gray scale, driving characteristics of pixels which requires a low current to drive. Driving characteristics of simultaneously sensed pixels are sensed as the same value. For this reason, pixels simultaneously sensed on a block unit basis are compensated by the same compensation value (a gain value and an offset value). In FIG. 2B, a' denotes a gain value, a b' denotes an offset value. The compensation value for the pixels simultaneously sensed on a block unit basis is an average compensation value for the pixels. In this case, the pixels are not compensated sophistically, but a user may be able to enjoy good image quality on a high-resolution pixel array.

In FIG. 2C, coefficients a, b, and c defining a transfer curve may be calculated on a block unit basis based on a result of sensing a block. With respect to a block sensed as an average transfer curve of a display panel and a different curve 22*a*, data to be written to pixels of the block modulated into a gain value a and an offset value b so that driving characteristics of the pixels may be compensated to conform to the average transfer curve (Target I-V curve). In FIG. 2C, c may be set as a constant, such as 2.2. In FIGS. 2B and 2C, a Target I-V curve 21 may be an average transfer curve of the display panel shown in FIG. 2A. An IV curve 22*a* before/after compensation is a block's transfer curve different from the Target I-V curve 21.

Figure 15:
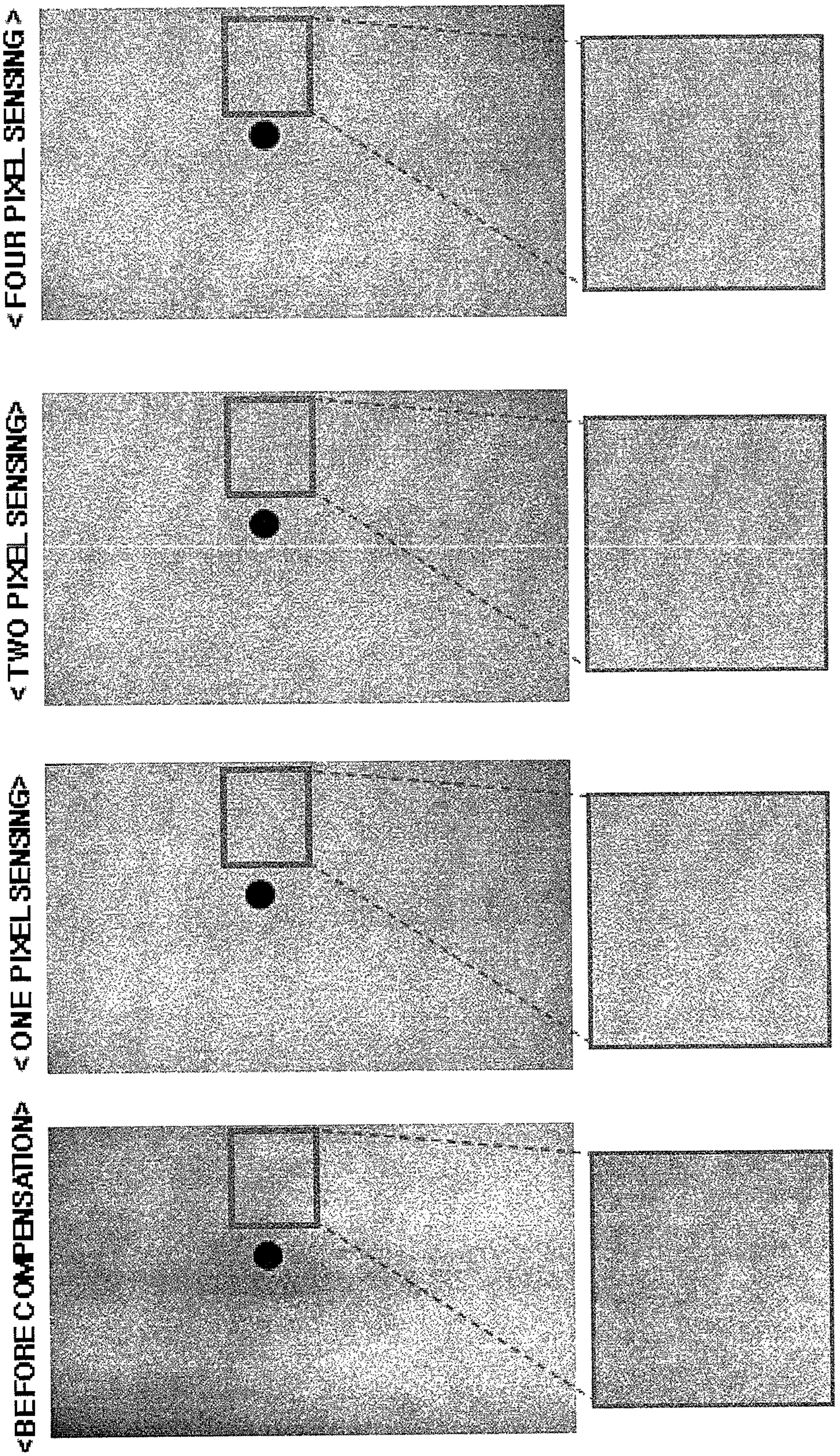
FIG. 15 is a diagram illustrating experiment results which show difference in compensation effects between a one-pixel sensing method and a multi-pixel sensing method.

Inventors of the present disclosure conducted experiments to compare image quality between a multi-pixel sensing method proposed in the present disclosure and a one-pixel sensing method. The multi-pixel sensing method is a method in which a plurality of pixels are sensed simultaneously and compensated, and the one-pixel sensing method is a method in which pixels are sensed and compensated independently. FIG. 15 is an enlarged view illustrating a result image of the experiment. In FIG. 15, the drawing shown below <BEFORE COMPENSATION> is an enlarged view of part of a gray image displayed on a Full High-Definition (FHD) display panel in which pixels have driving characteristic deviations.

Figure 3:
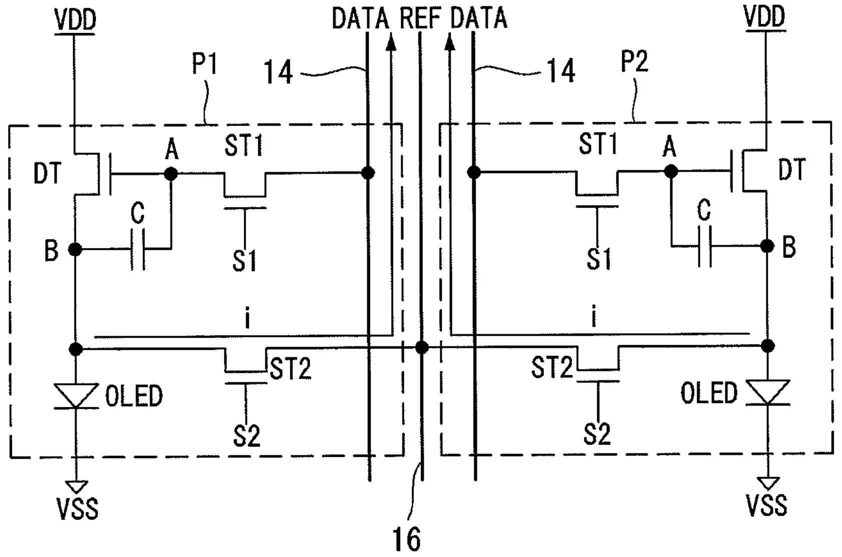
FIG. 3 is a circuit diagram illustrating a multi-pixel sensing method according to a first embodiment of the present disclosure.
Figure 4:
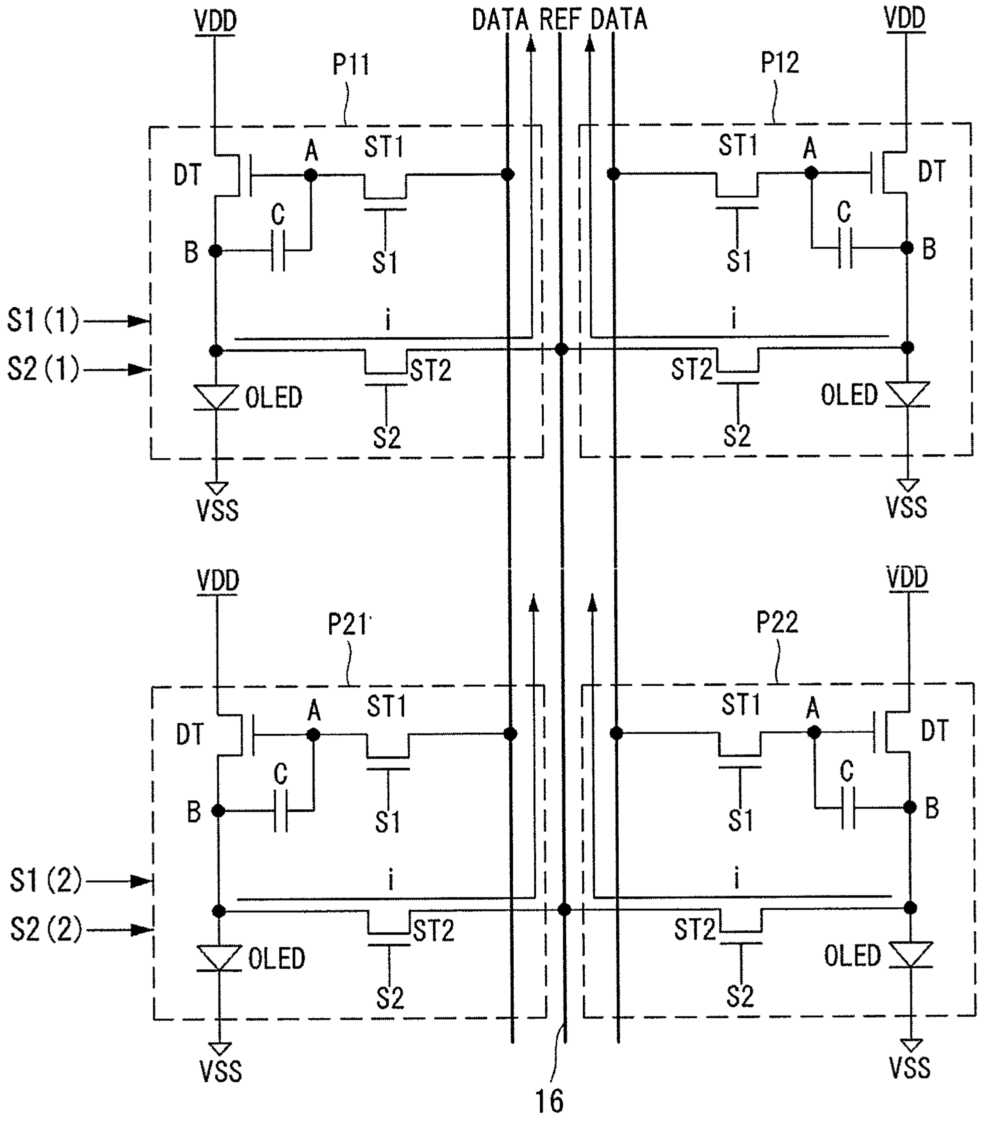
FIG. 4 is a circuit diagram illustrating a multi-pixel sensing method according to a second embodiment of the present disclosure.

The multi-pixel sensing method is a sensing method proposed in the present disclosure, in which pixels sharing a sensing path are sensed simultaneously. Multi-pixel sensing methods applied to the experiment are a two-pixel sensing method of simultaneously sensing two horizontally neighboring pixels, as shown in FIG. 3, and a four-pixel sensing method of simultaneously sensing four vertically and horizontally neighboring pixels, as shown in FIG. 4. Even though the two-pixel sensing method and the four-pixel sensing method are applied in the experiment, the multi-pixel sensing method of the present disclosure is not limited thereto. For example, the multi-pixel sensing method of the present disclosure may simultaneously sense two or more pixels which share a sensing path and are spaced apart from each other, or may simultaneously sense four or more pixels through the same sensing path.

Inventors of the present disclosure have found that, when the multi-pixel sensing method of the present disclosure is applied to a display panel of which resolution is FHD or higher than FHD, driving characteristic deviations of pixels are compensated, so that image quality may be significantly improved and it may not lead to a big difference in compensation effects, compared to when the one-pixel sensing method is employed. If resolution becomes higher to Ultra High-Definition (UHD) and Quad High Definition (QHD), it is hard to recognize a difference in compensation effects between the one-pixel sensing method and the multi-pixel sensing method.

FIG. 3 is a circuit diagram illustrating a multi-pixel sensing method according to a first embodiment of the present disclosure. This embodiment of the present disclosure corresponds to a two-pixel sensing method in FIG. 15.

Referring to FIG. 3, the multi-pixel sensing method of the present disclosure is implemented in a manner of simultaneously sensing two pixels P1 and P2 which share a sensing path. This embodiment is an example in which horizontally neighboring pixels are sensed simultaneously, but the simultaneously sensed pixels may be pixels spaced apart from each other.

Each of the pixels P1 and P2 includes an OLED, a driving TFT DT, first and second switch TFT ST1 and ST2, and a storage capacitor C. A pixel circuit is not limited to FIG. 3.

The OLED includes an organic compound layer EL formed between an anode and a cathode. The organic compound layer EL may include a hole injection layer HIL, a hole transport layer HTL, an emission layer EML, an electron transport layer ETL, an electron injection layer EIL, and the like. However, aspects of the present disclosure are not limited thereto.

The TFTs ST1, ST2, and DT are illustrated as n-type Metal-Oxide Semiconductor Field Effect Transistors (MOSFETs), but they may be implemented as p-type MOSFETs. Each of the TFTs may be implemented as an amorphous silicon (a-Si) TFT, a polysilicon TFT, and an oxide semiconductor TFT, or a combination thereof.

The anode of the OLED is connected to the driving TFT DT via a second node B. The cathode of the OLED is connected to a base voltage source to be supplied with a base voltage VSS.

The driving TFT DT regulates a current Ioled flowing in the OLED according to a gate-source voltage Vgs. The driving TFT DT includes a gate connected to a first node A, a drain to which a high potential driving voltage VDD is supplied, and a source connected to the second node B. The storage capacitor C is connected between the first node A and the second node B to maintain the gate-source voltage Vgs of the driving TFT DT.

In response to a first scan pulse S1, a first switch TFT ST1 supplies a data voltage Vdata from a data line 14 to the first node A. The first switch TFT ST1 includes a gate to which the first scan pulse S1 is supplied, a drain connected to the data line 14, and a source connected to the first node A.

In response to the second scan pulse S2, the second switch TFT ST2 switches a current path between the second node B and a reference voltage line 16. The switch TFT ST2 includes a gate to which the second scan pulse S2 is supplied, a drain connected to the second node B, and a source connected to the reference voltage line 16.

The neighboring pixels P1 and P2 with the reference voltage line 16 disposed therebetween are simultaneously sensed in a sensing period via a sensing path including the reference voltage line 16. Therefore, the two-pixel sensing method increases the current flowing along the reference voltage line 16 about twice, compared to an one-pixel sensing method, so that it is possible to sense driving characteristics of the pixels P1 and P2 in low gray scales below the lower bound range of the ADC.

FIG. 4 is a circuit diagram illustrating a multi-pixel sensing method according to a second embodiment of the present disclosure. This embodiment corresponds to a four-pixel sensing method in FIG. 15.

Referring to FIG. 4, the multi-pixel sensing method of the present disclosure simultaneously sense four pixels P11, P12, P21, P22 sharing a sensing path. First and second pixels P11 and P12 arranged on the $N^{th}$ line (N is a positive integer) on a pixel array, and third and fourth pixels P21 and 22 arranged on the $(N+1)^{th}$ line are vertically and horizontally neighboring pixels and share a sensing path including the reference voltage line 16. This embodiment is about an example in which vertically and horizontally neighboring pixels are sensed simultaneously. However, the simultaneously sensed pixels may be pixels spaced apart from each other. Each of the pixels P11, P12, P13, and P14 have a structure substantially identical to that shown in FIG. 3, and thus, detailed descriptions thereof will be hereinafter omitted. The pixels P11, P12, P21, and P22 sharing a sensing path including the reference voltage line 16 are simultaneously sensed in a sensing period. Therefore, the present disclosure increases a current I flowing along the reference voltage line 16 about four times compared to the one-pixel sensing method is employed, so that it is possible to sense driving characteristics of the pixels P1 and P2 in low gray scales below the lower bound range of the ADC.

Figure 5:
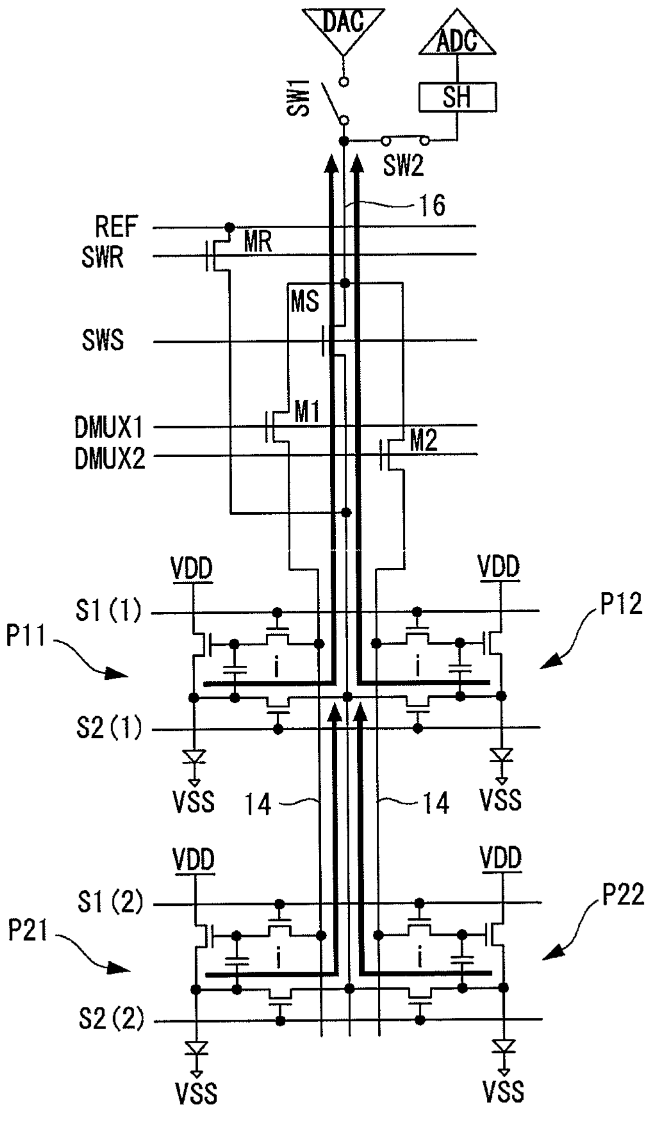
FIG. 5 is a circuit diagram illustrating a sensing path in a multi-pixel sensing method with respect to pixels shown in FIG. 3.

FIG. 5 is a circuit diagram illustrating a sensing path in a multi-pixel sensing method with respect to pixels shown in FIG. 3. FIG. 6 is a waveform diagram illustrating a method of controlling pixels and a sensing path which are shown in FIG. 5. This embodiment corresponds to a two-pixel sensing method.

Referring to FIGS. 5 and 6, an organic light emitting display of the present disclosure further includes a demultiplexer (DMUX) M1 and M2 connected between an reference voltage line 16 and a plurality of data lines 14, a first sensing switch MS connected to the reference voltage line 16, a REF switch MR, a second sensing switch SW2 connected between the reference voltage line 16 and a sample & holder SH, an ADC connected to the sample & holder SH, and a data switch SW1 connected between the reference voltage line 16 and the DAC.

In a sensing period, a sensing data voltage is supplied to the pixels P11 to P22. The sensing data SDATA may be generated as low gray-scale data or high gray-scale data. The low gray-scale data may be selected from low gray-scale data of which 2-bit Most Significant Bits (MSB) is “00” in 8-bit data. The high gray-scale data may be selected from high gray-scale data of which 2-bit MSB in 8-bit data is “11”.

The DAC converts sensing data SDATA, which is received in the data driver 12 in the sensing period, into an analog gamma compensation voltage to thereby generate a sensing data voltage. The DAC converts data MDATA of an input image, which is received in the data driver 12 in a normal driving period, into an analog gamma compensation voltage to thereby generate a data voltage to be displayed in pixels. An output voltage of the DAC is a data voltage to be supplied to the data lines 14 via the DMUX M1 and M2. The DAC may be embedded in the data driver 12.

The ADC converts a voltage generated by currents I of the pixels in a sensing period into digital data to thereby output a sensing value SEN. The sensing value SEN is transmitted to the data modulator 20 through the timing controller 11. The ADC may be embedded in the data driver 12.

In the sensing period, under control of the timing controller 11, the DMUX M1 and M2 distributes a sensing data voltage output from the DAC to the first and second data lines 14. In the normal driving period, under control of the timing controller 11, the DMUX M1 and M2 distributes a data voltage of an input image output from the DAC to the first and second data lines 14.

The DMUX M1 and M2 includes a first switch M1 connected between the reference voltage line 16 and the first data line 14, and a second switch M2 connected between the reference voltage line 16 and the second data line 14. The DMUX M1 and M2 may be embedded in the data driver 12 or may be formed directly on the display panel 10. In the embodiment of FIG. 5, the first data line 14 is a neighboring data line 14 on the left side of the reference voltage line 16.

The second data line 14 is a neighboring data line 14 on the right side of the reference voltage line 16.

In response to a first DMUX signal DMUX1, the first switch M1 supplies a data voltage output from the DAC to the pixels P11 and P21 through the first data line 14. In response to a second DMUX signal DMUX2, the second switch M2 supplies a data voltage output from the DAC to the pixels P12 and P22 through the second data line 14.

Under control of the timing controller 11, the first sensing switch MS switches a sensing path. Under control of the timing controller 11, the REF switch MR switches a transmission path of a reference voltage REF. The transmission path of the reference voltage REF includes the REF switch MR, the reference voltage line 16, and the second switch TFT ST2. The reference voltage REF is supplied to the second node B of the pixels P11, P12, P21, and P22 through the transmission path of the reference voltage REF.

The REF switch MR is turned on in response to an SWR signal received from the timing controller 11. The SWR signal is synchronized with a control signal for controlling the data switch SW1 (hereinafter, referred to as a "SW1 signal"). Pulse duration of the SWR signal and the SW1 signal may be approximately a 2-horizontal period, but aspects of the present disclosure are not limited thereto. In addition, the SWR signal and the SW1 signal are synchronized with first scan pulses S1(1) and S1(2). The first scan pulses S1(1) and S1(2) may occur within a pulse width of approximately a 1-horizontal period 1H, but aspects of the present disclosure are not limited thereto. The first scan pulses S1(1) and S1(2) overlap the first and second DMUX signals DMUX1 and DMUX2, respectively. The first scan pulse S1(1) is a scan pulse that turns on the first switch TFT ST1 of the pixels P11 and P12 arranged on the $N^{th}$ line. The scan pulse S1(2) is a scan pulse that turns on the first switch TFT ST1 of the pixels P21 and P22 arranged on the $N+1^{th}$ line.

The pulse duration of the SWR signal and the SW1 signal overlaps the first DMUX signal DMUX1 and the second DMUX signal DMUX2. Each of the DMUX signals DMUX1 and DMUX2 may occur within a pulse width of for ½ horizontal period, but aspects of the present disclosure are limited thereto. The second DMUX signal DMUX2 occurs after the first DMUX signal DMUX1.

In response to the SWS signal received from the timing controller 11, the first sensing switch MS turns on after the REF switch MR.

The SWS signal rises following after the SWR signal, and has pulse duration longer than that of the SWR signal. The SWS signal is a control signal for controlling the second sensing switch SW2 (hereinafter, referred to as a "SW2 signal"). Accordingly, the first and second sensing switches MS and SW2 turn on simultaneously. In the embodiment of FIG. 5, the pulse duration of the SWS signal and the SW2 signal are illustrated as a 7-horizontal period, but aspects of the present disclosure are not limited thereto.

The second scan pulses S2(1) and S2(2) rise simultaneously with the first scan pulses S1(1) and S1(2), and fall after the first scan pulses S1(1) and S1(2). The pulse duration of the second scan pulses S2(1) and S2(2) are illustrated as a 9-horizontal period in the embodiment of FIG. 6, but aspects of the present disclosure are not limited thereto. The pulse duration of the second scan pulses S2(1) and S2(2) overlap the SW1 signal, the SW2 signal, the SWR signal, the SWS signal, and the DMUX signals DMUX1 and DMUX2. The second scan signal S2(1) is a scan pulse that turns on the second switch TFT ST2 of the pixels P11 and P12 arranged on the $N^{th}$ line. The second scan signal S2(2) is a scan pulse that turns on the second switch TFT ST2 of the pixels P21 and P22 arranged on the $N+1^{th}$ line.

When the pixels P11 and P12 arranged on the $N^{th}$ line are sensed, a sensing data voltage is supplied to the first node A of the pixels P11 and P12, and a reference voltage REF is supplied to the second node B of the pixels P11 and P12. In this case, the sensing data voltage is applied to a gate of the driving TFT DT. As a result, a current i starts to flow into an OLED through the driving TFT DT.

When the first sensing switch MS and the second switch TFT ST2 of the pixels P11 and P12 turn on, the current i of the OLED flows along the reference voltage line 16. In this case, a current flowing in the pixels P11 and P12 sharing a sensing path is added to the reference voltage line 16, so that a current of the reference voltage line is increased by about twice. In FIG. 6, VS(1) denotes a sensing voltage which rises by a sum of currents flowing in the pixels P11 and P12 arranged on the $N^{th}$ line. The sensing voltage applied to the reference voltage line 16 is sampled by the sample &holder SH, and then converted into digital data through the ADC. A sensing value SEN output from the ADC is transmitted to the timing controller 11.

After the pixels P11 and P12 on the $N^{th}$ line are sensed simultaneously, driving characteristics of the pixels P21 and P22 sharing a sensing path on the (N+1)-th are sensed simultaneously. In FIG. 6, VS(2) denotes a sensing voltage that rises by a sum of currents flowing in the pixels P21 and P22 on the $N+1^{th}$ line.

Figure 7:
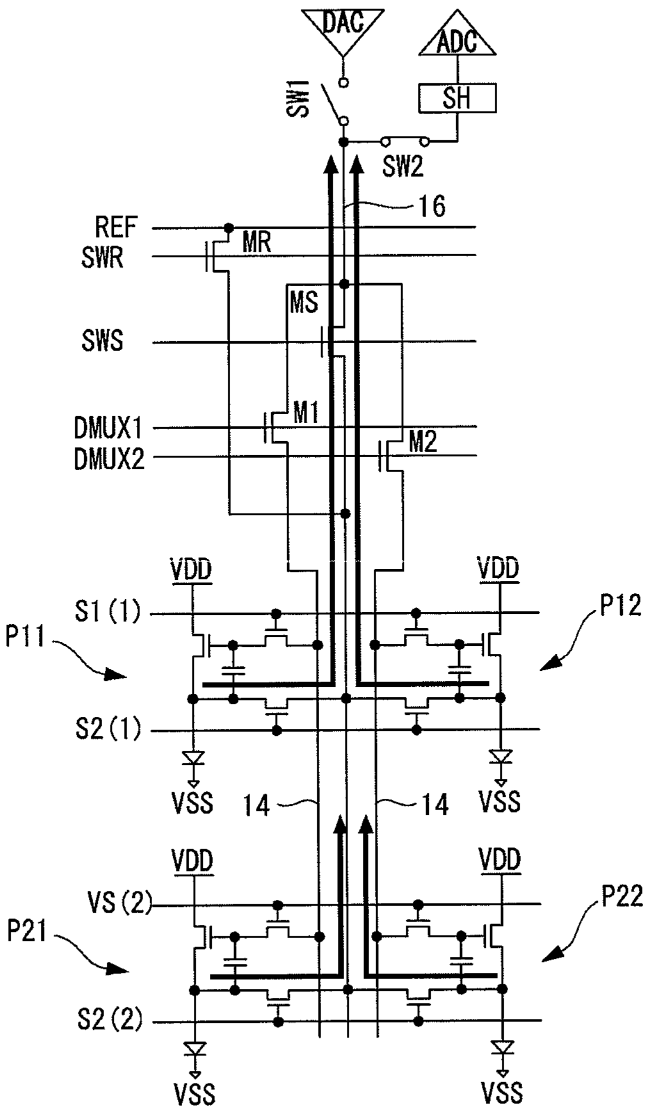
FIG. 7 is a circuit diagram illustrating a sensing path in a multi-pixel sensing method with respect to pixels shown in FIG. 4.

FIG. 7 is a circuit diagram illustrating a sensing path in a multi-pixel sensing method with respect to pixels shown in FIG. 4. FIG. 8 is a waveform diagram illustrating a method of controlling pixels and a sensing path which are shown in FIG. 7. This embodiment corresponds to a four-pixel sensing method.

Referring to FIGS. 7 and 8, an organic light emitting display of the present disclosure further includes a DMUX M1 and M2 connected between an reference voltage line 16 and a plurality of data lines 14, a first sensing switch MS connected to the reference voltage line 16, an REF switch MR, and a second sensing switch SW2 connected between the reference voltage line 16 and a sample & holder SH, an ADC connected to the sample & holder SH, and a data switch SW1 connected between the reference voltage line 16 and the DAC.

In this embodiment, the pixel array has a structure substantially identical to that of the pixel array shown in FIG. 5, and thus, detailed descriptions thereof will be hereinafter omitted. In this embodiment, as shown in FIG. 8, a sensing data voltage is applied to the pixels P11, P12, P21, and P22, pixels P11, P12, P21, and P22 arranged on two lines, and the second pulses S2(1) and S2(2) supplied to the pixels P11, P12, P21, and P22 overlap each other, so that the pixels P11, P12, P21, and P22 are sensed simultaneously.

The pulse duration of the SWR signal and the SW1 signal overlap the first DMUX signal DMUX1 and the second DMUX signal DMUX2. The SWR signal and the SW1 signal occur within a pulse width of a 3-horizontal period in the embodiment of FIG. 8, but it is not limited thereto. Each of the DMUX signals DMUX1 and DMUX2 occurs twice for the pulse duration of the SW1 signal so that the sensing data voltage is supplied to the four pixels P11, P12, P21, and P22. Each of the DMUX signals DMUX1 and DMUX2 may occur twice within a pulse width of a ½-horizontal period. The second DMUX signal DMUX2 occurs after the first DMUX signal DMUX1.

The SWS signal rises after the SWR signal, and has pulse duration longer than that of the SWR signal. The SWS signal is synchronized with the SW2 signal.

The second scan pulses S2(1) and S2(2) rise simultaneously with the first scan pulses S1(1) and S1(2), and fall after the first scan pulses S1(1) and S1(2). The pulse duration of the second scan pulses S2(1) and S2(2) overlaps the SW1 signal, the SW2 signal, the SWR signal, the SWS signal, and the DMUX signals DMUX1 and DMUX2. To simultaneously sense the four pixels arranged on the $N^{th}$ line and the $N+1^{th}$ line, the second scan pulse S2(1) and the second scan pulse S2(2) overlap each other. In order to simultaneously sense pixels arranged on multiple lines, a current has to flow along a sensing path shared by the pixels, so the two more second scan pulses S2(1) and S2(2) need to overlap each other. The second scan pulse S2(1) is a scan pulse that turns on the second switch TFT ST2 of the pixels P11 and P12 arranged on the $N^{th}$ line. The second scan pulse S2(2) is a scan pulse that turns on the second switch TFT ST2 of the pixels P21 and P22 arranged on the $N+1^{th}$ line.

The four-pixel sensing method starts out by supplying a sensing data voltage to the first node A of the pixels P11 and P12, and P21 and P22, and then supplying a reference voltage REF to the second node B of the pixels P11 and P12, and P21 and P22. At this point, the sensing data voltage is applied to a driving TFT DT of each of the pixels P11, P12, P21, and P22 sharing a sensing path, and a current i starts to flow into an OLED through the driving TFT DT.

When the first sensing switch MS and the second switch TFT ST2 are turned on, a current i of the OLED flows along the reference voltage line 16. At this point, currents flowing in the pixels P11, P12, P21, and P22 sharing the sensing path are added to the reference voltage line 16, so that a current i of the Reference voltage line 16 is increased by about four times. In FIG. 8, VS(1~4) is a sensing voltage that rises by a sum of the currents flowing in the pixels P11, P12, P21, and P22 arranged on the $N^{th}$ line and $N+1^{th}$ line. The sensing voltage applied to the reference voltage line 16 is sampled by the sample & holder SH, and converted into digital data through the ADC. A sensing value SEN output from the ADC is transmitted to the timing controller 11. After pixels arranged on two lines and sharing a sensing path are sensed simultaneously, pixels arranged on the next two lines are sensed simultaneously.

After the pixels P11, P12, P21, and P22 arranged on the $N^{th}$ line and the $N+1^{th}$ line are sensed simultaneously, driving characteristics of pixels arranged on the $N+2^{th}$ line and the $N+3^{th}$ line are sensed simultaneously. In FIG. 8, VS(5~8) denotes a sensing voltage that rises by a sum of currents flowing in four pixels which are arranged on the $N+2^{th}$ line and the $N+3^{th}$ line and share a sensing path.

Figure 9:
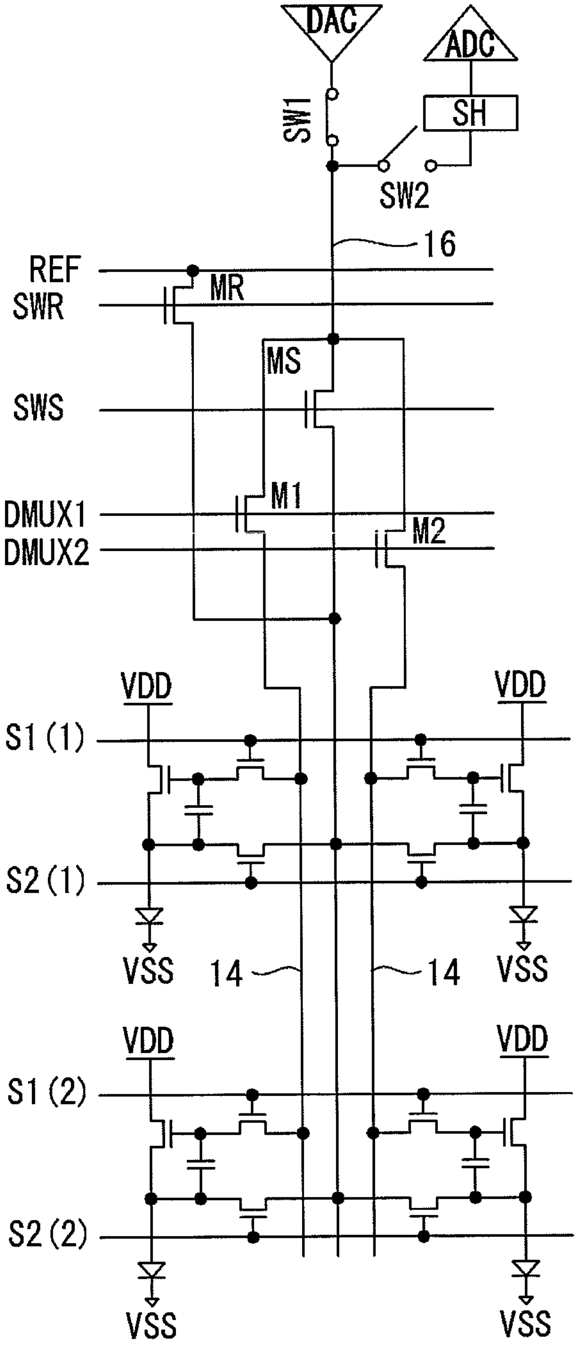
FIG. 9 is a circuit diagram illustrating a path along which data of an input image is supplied in a normal driving mode.
Figure 10:
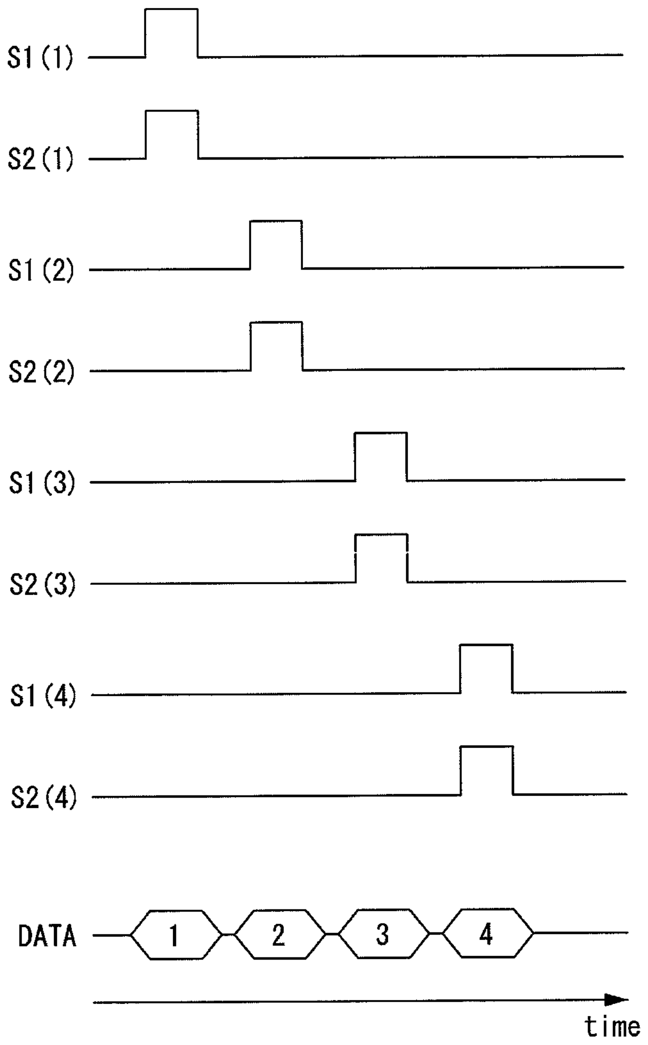
FIG. 10 is a waveform diagram illustrating a method of controlling pixels and a sensing path which are shown in FIG. 9.

FIG. 9 is a circuit diagram illustrating a path along which data of an input image is supplied in a normal driving mode. FIG. 10 is a waveform diagram illustrating a method of controlling pixels shown in FIG. 9 and a sensing path.

Referring to FIGS. 9 and 10, data of an input image is sequentially written to pixels on a line unit basis in a normal driving mode. To this end, switch devices SW1, MS, MR, DMUX (M1 and M2), etc. are turned on in FIG. 9 to form a data voltage transmission path and a reference voltage path. Meanwhile, the device SW2 is turned off.

First scan pulses S1(1) to S1(*n*) are sequentially shifted by a shift register. Similarly, second scan pulses S2(1) to S2(*n*) are sequentially shifted by a shift register. First and second scan pulses supplied to the same pixel are synchronized. In a normal driving mode, a reference voltage REF is supplied to the second node B, and a data voltage of an input image is supplied to the first node A. In FIG. 10, DATA denotes data of an input image which is synchronized with the first and second scan pulses to be written to pixels. In a normal driving mode, the data voltage of the input image is applied to the first node A of a pixel, that is, a gate of a driving TFT DT.

Figure 11:
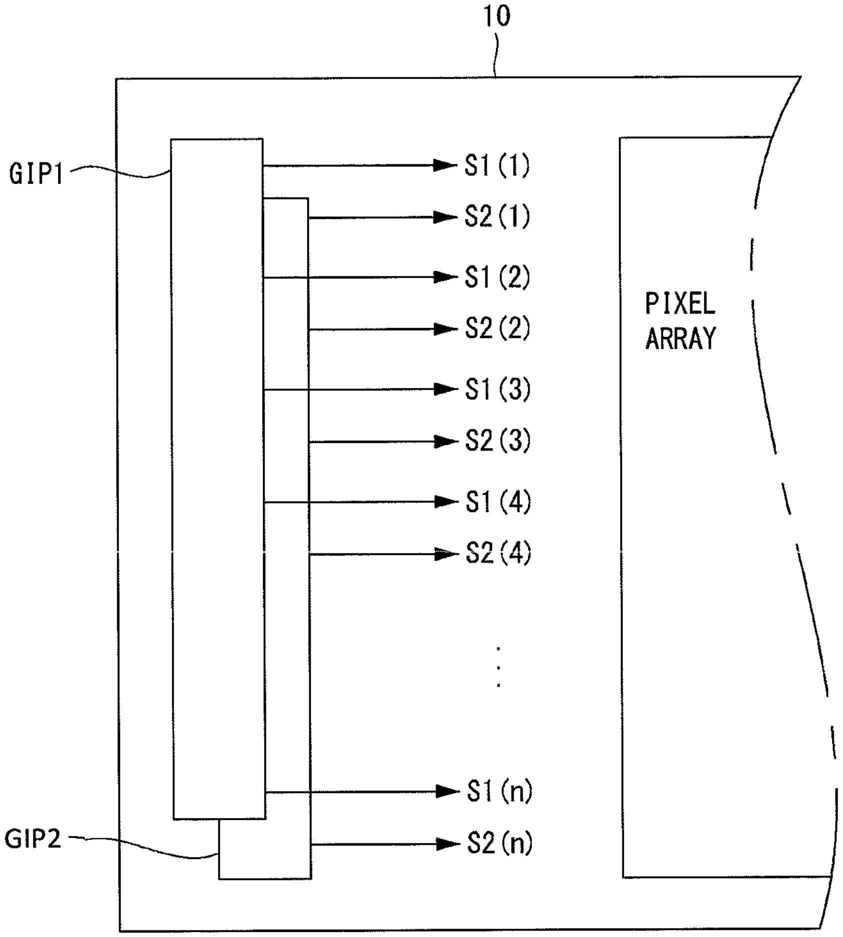
FIGS. 11 and 12 are diagrams illustrating a GIP circuit.
Figure 12:
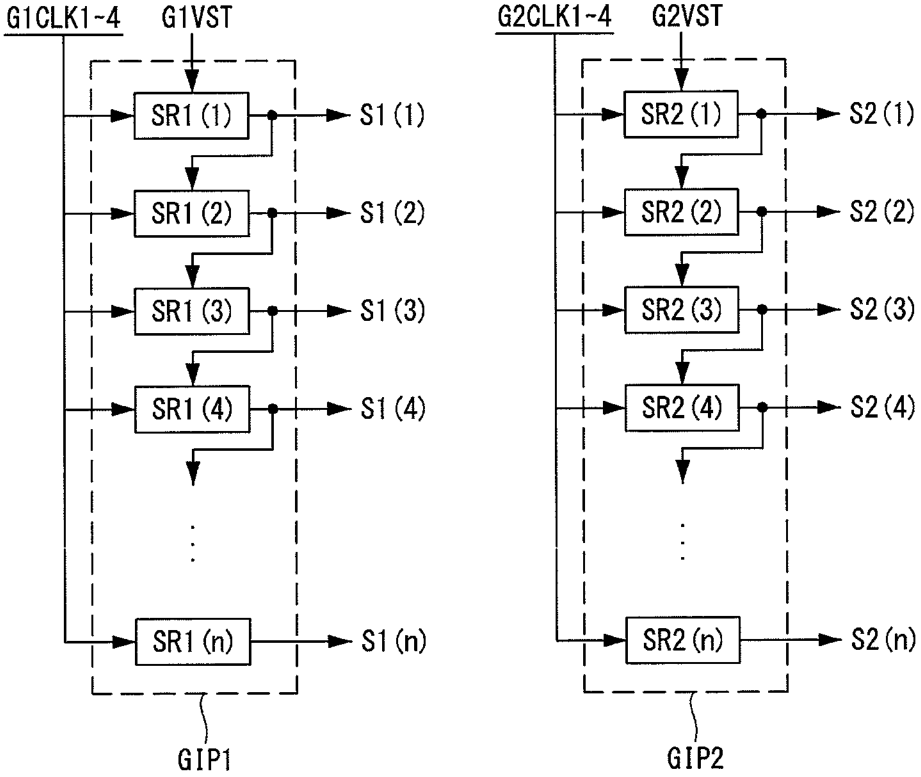
Figure 13:
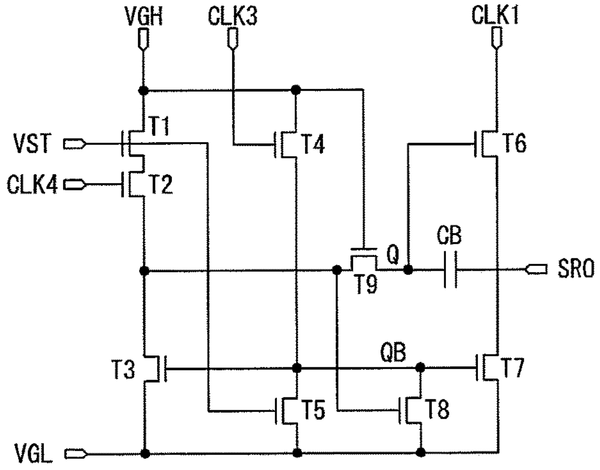
FIG. 13 is a circuit diagram illustrating a structure of a stage circuit of a GIP circuit.
Figure 14:
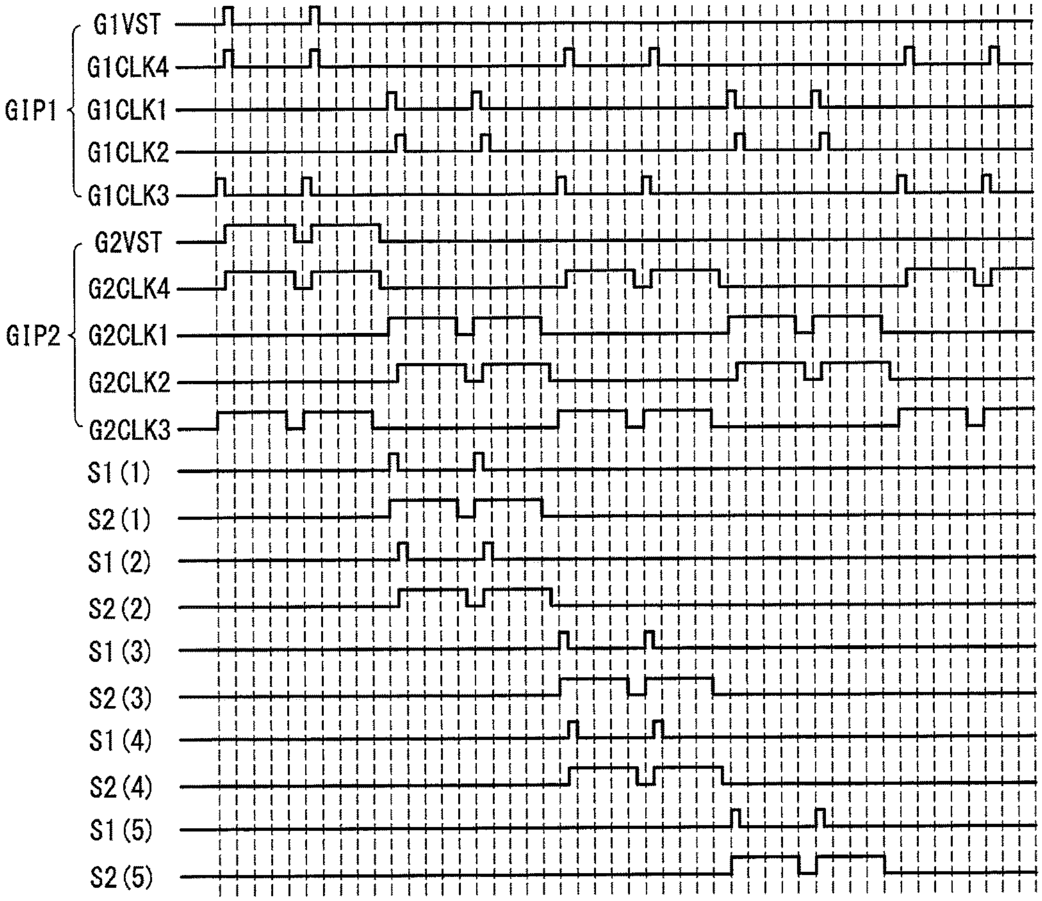
FIG. 14 is a waveform diagram illustrating signals for controlling the GIP circuit shown in FIG. 13, and an output from the GIP circuit when pixels are sensed simultaneously on two lines.

FIGS. 11 and 12 are diagrams illustrating a GIP circuit. FIG. 13 is a circuit diagram illustrating a structure of a stage circuit of a GIP circuit. FIG. 14 is a waveform diagram illustrating signals for controlling the GIP circuit shown in FIG. 13, and an output from the GIP circuit when pixels are sensed simultaneously on two lines.

Referring to FIGS. 11 to 14, a gate driver includes first and second GIP circuits formed directly on a substrate of a display panel 10. The first GIP circuit includes a shift register to sequentially generate first scan pulses S1(1) to S1(*n*). The second GIP circuit includes a shift register to sequentially generate second scan pulses S2(1) to S2(*n*). A timing controller 11 generates gate timing control signals G1VST, G1CLK1 to G1CLK 4, G2VST, and G2CLK1 to G2CLK4 to control operating timings of the first and second GIP circuits GIP1 and GIP2. The first and second GIP circuits GIP1 and GIP2 are synchronized by the timing controller 11. The gate timing control signals G1VST, G1CLK1~4, G2VST, and G2CLK1 to 4 occur at a digital logic voltage level in the timing controller 11. TFTs on a GIP circuit are formed simultaneously with TFTs on a pixel array, and have a structure similar to that of the TFTs on the pixel array such that that the TFTs on the GIP circuit are driven at a digital logic voltage higher than that of the TFTs on the pixel array. Therefore, the gate timing control signals G1VST, G1CLK1 to G1CLK 4, G2VST, and G2CLK1 to G2CLK 4 output from the timing controller 11 are changed by a level shifter (not shown) into a voltage that swings between a gate high voltage VGH and a gate low voltage VGL. The gate high voltage VGH is a voltage higher than a threshold voltage of the TFTs on the pixel array and the TFTs on the GIP circuits GIP1 and GIP2. The gate low voltage VGL is a voltage lower than the threshold voltage of the TFTs on the pixel array and the TFTs on the GIP circuits GIP1 and GIP2.

The shift register of the first GIP circuit GIP1 includes dependently connected stages SR1(1) to SR1(*n*). The stages SR1(1) to SR1(*n*) generate first outputs in response to a first start pulse G1VST, and shifts the outputs in response to the shift clocks G1CLK1 to G1CLK4 to sequentially output the first scan pulses S1(1) to S1(*n*). The shift register of the second GIP circuit GIP2 includes dependently connected stages SR2(1) to SR2(*n*). The stages SR2(1) to SR2(*n*) output first outputs in response to a second start pulse G2VST, and shift the outputs in response to shift clocks G2CLK1 to G2CLK4 to sequentially output the second scan pulses S2(1) to S2(*n*).

To simultaneously sense pixels P11, P12, P21, and P22 arranged on the $N^{th}$ line and the $N+1^{th}$ line that share a sensing path, the clocks G2CLK1 to G2CLK4 that are applied to the second GIP circuit GIP2 overlap each other. In the case of a four-phase clock, as shown in FIG. 14, the shift clocks G2CLK1 and G2CLK2 that are input through two clock lines overlap each other, while these shift clocks G2CLK1 and G2CLK2 are not overlapping the shift clocks G2CLK3 and G2CLK4 that are input through two different clock lines. Meanwhile, the shift clocks G2CLK3 and G2CLK4 that are input through the two different clock lines overlap each other. The start pulse G2VST is synchronized with the shift clock G2CLK4 which occurs first. The shift clocks G2CLK1 to G2CLK4 that are applied to the second GIP circuit GIP2 do not have to be overlapping one another.

Each of the stages includes: a Q node which controls a pull-up transistor T6 shown in FIG. 13; a QB node which controls a pull-down transistor T7; and a switch circuit which controls charging and discharging the Q node and the QB node. The switch circuit may include a plurality of TFTs T1 to T5, T8, and T9. The TFTs T1 to T9 may be implemented as n-type MOSFETs, but aspects of the present disclosure are not limited thereto.

In each of the first and second GIP circuits GIP1 and GIP2, a stage circuit of a shift register may have the same structure as shown in FIG. 13. The circuit structure shown in FIG. 13 will be described in the assumption that a stage in which an output SRO is generated in response to the first shift clock CLK1 is the $N^{th}$ stage. Following the $N^{th}$ stage, the $N+1^{th}$ stage generates an output in response to a second shift clock CLK2. "CLKn (n is 1, 2, 3, or 4)" shown in FIG. 13 may be G1CLKn or G2CLKn in FIG. 14.

When VST and CLK4 are input at the same time, the first and second TFTs T1 and T2 charge the Q node Q with a gate high voltage VGH. In response to VST, the first TFT T1 is turned on. VST may be a start pulse G1VST or G2VST shown in FIGS. 11 and 12, may be an output from a previous stage, that is, the $N-1^{th}$ stage, or may be a carry signal. The start pulse VST is input to the $N^{th}$ stage through a VST node. A gate of the first TFT T1 is connected to the VST node. A drain of the first TFT T1 is connected to a VGH node. A gate high voltage VGH is supplied to the VGH node. A source of the first TFT T1 is connected to a drain of the second TFT T2. The second TFT T2 is turned on in response to CLK4. A gate of the second TFT T2 is connected to a CLK4 node. A source of the second TFT T2 is connected to the Q node Q. The drain of the second TFT T2 is connected to the source of the first TFT T1.

The third TFT T3 discharges the Q node Q in response to a voltage of the QB node QB. A gate of the third TFT T3 is connected to the QB node QB. A drain of the third TFT T3 is connected to the Q node Q. A source of the third TFT T3 is connected to a VGL node. A gate low voltage VGL is supplied to the VGL node.

In response to CLK3, the fourth TFT T4 charges the QB node QB. A gate of the fourth TFT T4 is connected to a CLK3 node. A drain of the fourth TFT T4 is connected to the VGH node. A source of the TFT T4 is connected to the QB node QB. In response to VST, the fifth TFT T5 discharges the QB node QB. A gate of the fifth TFT T5 is connected to the VST node. A drain of the fifth TFT T5 is connected to the CLK3 node. A source of the fifth TFT T5 is connected to the VGL node.

In response to a voltage of the Q node Q, the eighth TFT T8 discharges the QB node QB. A gate of the eighth TFT T8 is connected to the Q node Q. A drain of the eighth TFT T8 is connected to the QB node QB. A source of the eighth TFT T8 is connected to the VGL node.

When a voltage of the VGH node is reduced, the ninth TFT T9 separates the Q node Q to render the Q node Q floating. A gate of the TFT T9 is connected to the VGH node. A drain of the ninth TFT T9 is connected to one side of the Q node Q, and a source of the ninth TFT T9 is connected to the other side of the Q node Q. While a voltage of the VGH node is high, the ninth TFT T9 remains in an ON state. The ninth TFT T9 can be omitted.

The sixth TFT T6 is a pull-up transistor. If CLK1 is input when a voltage of the Q node Q has been charged to VGH, the voltage of the Q node Q is increased to 2VGH due to a bootstrapping phenomenon to thereby turn on the sixth TFT T6. In this case, a current is supplied to an output node through the sixth TFT T6, and thereby, a voltage of the output node rises. A gate of the sixth TFT T6 is connected to the Q node Q. A drain of the sixth TFT T6 is connected to a CLK1 node, and a source of the sixth TFT T6 is connected to the output node.

The seventh TFT T7 is a pull-down transistor that discharges a voltage of the output node in response to a voltage of the QB node QB. A gate of the seventh TFT T7 is connected to the QB node QB. A drain of the seventh TFT T7 is connected to the output node. A source of the seventh TFT T7 is connected to the VGL node.

In the above-described embodiments of the present disclosure, a two-pixel sensing method and a four-pixel sensing method are explained, but aspects of the present disclosure are not limited thereto. For example, the present disclosure is able to simultaneously sense four or more pixels which are arranged on two or more lines and share a sensing path.

As described above, an organic light emitting display of the present disclosure includes: a first switch circuit that supplies a sensing data voltage through the data lines 14 to pixels sharing a sensing path; a second switch circuit that turns on a switch, which connects OLEDs of pixels and the sensing path, so as to simultaneously supply currents of the pixels to the sensing path; and a sensing circuit that samples a voltage of the sensing path, converts the sampled voltage into digital data, and outputs a sensing value of the pixels. The sensing path includes a reference voltage line 16 connected to the sensing circuit. The first switch circuit includes a DMUX connected between the reference voltage line 16 and a plurality of data lines 14, and a first shift register (or a first GIP circuit) that outputs the first scan pulses S1(1) to S1(*n*). The second switch circuit includes a second shift register that outputs the second scan pulses S2(1) and S2(*n*).

The present disclosure simultaneously senses a plurality of pixels sharing a sensing path, thereby enabled to stably sense driving characteristics of the pixel in the low gray-scale. In addition, the present disclosure senses driving characteristics of high-resolution and high-contrast pixels to compensate for driving characteristic deviation, thereby enabled to improve image quality. Moreover, the present disclosure simultaneously senses pixels sharing a sensing path so that the number of sensing paths on a display panel may be minimized, and thereby, an aperture ratio of pixels may improve and a sensing time may be reduced.

Furthermore, the present disclosure detects a sensing value from each block so that a capacity of a memory storing sensing values may be significantly reduced, and, in turn, a circuit may be manufactured with less cost.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An organic light emitting display comprising:

a plurality of pixels sharing a sensing path;

a first switch circuit configured to supply a sensing data voltage to the pixels sharing the sensing path through data lines in response to a first scan pulse;

a second switch circuit configured to electrically connect an Organic Light Emitting Diode (OLED) of each of the pixels with the sensing path in response to a second scan pulse, to simultaneously supply currents of the pixels to the sensing path in a sensing period; and a sensing circuit configured to sense a sensing value through the sensing path, wherein the sensing path includes a reference voltage line connected to the pixels to provide the currents of the pixels to the sensing circuit, and wherein the pixels simultaneously sensed by the sensing circuit have a same sensing value, and data to be written to the pixels is compensated with a same compensation value.

2. The organic light emitting display of claim 1, wherein the pixels comprise horizontally neighboring pixels with the reference voltage line disposed therebetween, and the pixels are simultaneously sensed in the sensing period via the sensing path and are arranged on a same line on a pixel array.

3. The organic light emitting display of claim 1, wherein the pixels comprise vertically and horizontally neighboring pixels with the reference voltage line disposed therebetween, and the pixels are simultaneously sensed in the sensing period via the sensing path and are arranged on two or more lines on a pixel array.

4. The organic light emitting display of claim 1, wherein each of the pixels comprises:

a driving thin film transistor (TFT) configured to supply a current to the OLED according to a voltage on a first node;

a first switch TFT configured to, in response to the first scan pulse, supply the first node with the voltage that is supplied through any one of the data lines;

a second switch TFT configured to, in response to the second scan pulse, electrically connect the sensing path to an anode of the OLED via a second node; and a capacitor connected between the first node and the second node.

5. The organic light emitting display of claim 4, wherein the first and second scan pulses rise simultaneously, and a pulse duration of the second scan pulse is longer than a pulse duration of the first scan pulse.

6. The organic light emitting display of claim 5, wherein the first switch circuit comprises:

a demultiplexer configured to distribute, to a plurality of data lines, the sensing data voltage that is input through the sensing path during the pulse duration of the first scan pulse; and a first shift register configured to generate the first scan pulse.

7. The organic light emitting display of claim 5, wherein the second switch circuit comprises a second shift register that generates the second scan pulse.

8. The organic light emitting display of claim 6, wherein the demultiplexer comprises:

a first switch configured to supply a first sensing data voltage output from the sensing path to a first data line connected to a first pixel; and a second switch configured to supply a second sensing data voltage output from the sensing path to a second data line connected to a second pixel.

9. The organic light emitting display of claim 8, wherein the pixels comprise neighboring pixels which are arranged on two or more lines on a pixel array, and the second scan pulses sequentially supplied to the two or more lines overlap each other.

10. The organic light emitting display of claim 9, wherein shift clocks supplied to some of clock lines connected to the second shift register overlap each other, while not overlapping shift clocks are supplied through different clock lines, and wherein a start pulse input to the second shift register overlaps a shift clock that occurs first among the shift clocks.

11. The organic light emitting display of claim 4, further comprising:

a display panel including a plurality of data lines and gate lines crossing the data lines, wherein the plurality of pixels are arranged in a matrix on the display panel;

a data driver configured to supply the sensing data voltage to the plurality of pixels through the plurality of data lines; and a gate driver configured to supply the first and second scan pulses to the plurality of gate lines, wherein the sensing data voltage is supplied to a gate of the driving TFT.

12. An organic light emitting display comprising:

a sensing switch circuit configured to connect a plurality of pixels to a sensing path to simultaneously supply currents of the pixels to the sensing path;

a sensing circuit connected to the sensing switch circuit and configured to sense a sensing value through the sensing path in a sensing period; and a data switch circuit configured to supply a sensing data voltage to each of the pixels through data lines in the sensing period, wherein the sensing path includes a reference voltage line connected to the pixels to provide the currents of the pixels to the sensing circuit, and wherein the pixels simultaneously supplying currents to the sensing path have a same sensing value, and data written to the pixels is compensated with a same compensation value.

13. The organic light emitting display of claim 12, wherein the pixels connected to the sensing path comprise horizontally neighboring pixels with the reference voltage line disposed therebetween, the pixels being simultaneously sensed in the sensing period via the sensing path and arranged on a same line on a pixel array.

14. The organic light emitting display of claim 12, wherein the pixels connected to the sensing path comprise vertically and horizontally neighboring pixels with the reference voltage line disposed therebetween, the pixels being simultaneously sensed in the sensing period via the sensing path and arranged on two or more lines on a pixel array.

15. A method of driving an organic light emitting display having a plurality of pixels which share a sensing path, the method comprising:

supplying a sensing data voltage to each of the pixels through data lines;

turning on a switch to electrically connect an Organic Light Emitting Diode (OLED) of each of the pixels and the sensing path, to simultaneously supply currents of the pixels to the sensing path, wherein the sensing path includes a reference voltage line connected to the pixels to provide the currents of the pixels to a sensing circuit;

outputting a sensing value of the pixels by sampling a voltage of the sensing path and converting the sampled voltage into digital data; and compensating for a driving characteristic deviation of the pixels by modulating data of an input image to be written to the pixels based on the sensing value, wherein simultaneously sensed pixels have a same sensing value, and data to be written to the pixels is compensated with a same compensation value.

* * * * *